US009582159B2

United States Patent
Hsiao et al.

(10) Patent No.: US 9,582,159 B2
(45) Date of Patent: Feb. 28, 2017

(54) KEYWORD-BASED USER INTERFACE IN ELECTRONIC DEVICE

(71) Applicants: International Business Machines Corporation, Armonk, NY (US); Industrial Technology Research Institute, Hsinchu (TW)

(72) Inventors: Mark Hsiao, New Taipei (TW); Yi-Fang Lee, Taipei (TW); Yin-Pin Yang, Hsinchu (TW)

(73) Assignees: INTERNATIONAL BUSINESS MACHINES CORPORATION, Armonk, NY (US); INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 287 days.

(21) Appl. No.: 14/048,192

(22) Filed: Oct. 8, 2013

(65) Prior Publication Data

US 2014/0101208 A1    Apr. 10, 2014

(30) Foreign Application Priority Data

Oct. 9, 2012    (TW) .............................. 101137394 A (51) Int. Cl.
G06F 3/0484    (2013.01)
G06F 3/0481    (2013.01)
G06F 17/30    (2006.01)

(52) U.S. Cl.
CPC ........ *G06F 3/0484* (2013.01); *G06F 3/04817* (2013.01); *G06F 17/30327* (2013.01)

(58) Field of Classification Search
CPC ............... G06F 3/0484; G06F 3/04817; G06F 17/30327
See application file for complete search history.

(56) References Cited

U.S. PATENT DOCUMENTS 5,754,179 A     5/1998  Hocker et al.
7,149,983 B1 *  12/2006 Robertson ......... G06F 17/30398
                                                715/763
(Continued)

FOREIGN PATENT DOCUMENTS

CN      101409074 A      4/2009
CN      102043487 A      5/2011
(Continued)

OTHER PUBLICATIONS

Bastian et al, Desktop Menu Specification Mar. 3, 2011, developer.gnome.org, Version 1.1 Draft, https://developer.gnome.org/menu-spec/.*

(Continued)

*Primary Examiner* — Jason Liao
(74) *Attorney, Agent, or Firm* — Cantor Colburn LLP; David Quinn (57) ABSTRACT

A method for providing a user interface (UI) in an electronic device includes determining at least a starting keyword from a given target database, and associating each said starting keyword with a function of the electronic device; determining at least a linking keyword from a user profile database; creating a keyword tree from the at least a starting keyword and the at least a linking keyword, wherein the keyword tree has at least two layers, and the at least a linking keyword is placed in an upper layer relative to the at least a starting keyword; and providing the keyword tree on the electronic device for a user to browse and thereby select at least a said starting keyword by at least a said linking keyword on the keyword tree, thus starting the function.

4 Claims, 7 Drawing Sheets

(56) References Cited

U.S. PATENT DOCUMENTS

| | | | |
|---|---|---|---|
| 7,546,280 | B1 | 6/2009 | Ershov |
| 7,574,332 | B2 | 8/2009 | Ballin et al. |
| 8,229,942 | B1 | 7/2012 | Hubinette |
| 8,825,699 | B2 | 9/2014 | Kruzeniski et al. |
| 2003/0063129 | A1* | 4/2003 | Smyth ............... G06F 17/30867 715/810 |
| 2005/0086219 | A1 | 4/2005 | Martin |
| 2008/0005107 | A1 | 1/2008 | Funaki |
| 2010/0088254 | A1 | 4/2010 | Yang et al. |
| 2012/0131019 | A1 | 5/2012 | Sugiura |
| 2012/0167010 | A1 | 6/2012 | Campbell et al. |
| 2014/0038146 | A1 | 2/2014 | Liao et al. |
| 2014/0143697 | A1 | 5/2014 | Hsiao et al. |

FOREIGN PATENT DOCUMENTS

| | | | |
|---|---|---|---|
| TW | 201123037 | A | 7/2011 |
| TW | 201214164 | A | 4/2012 |
| TW | 201405328 | A | 2/2014 |

OTHER PUBLICATIONS

Jonik et al., How to change user's language (locale) back to English? [duplicate], Nov. 3, 2010, http://askubuntu.com/questions/11184/how-to-change-users-language-locale-back-to-english.*

Desktop files: putting your application in the desktop menus [captured by Archive.org on Jan. 1, 2012,] Gnome.org, https://web.archive.org/web/20120101225828/http://developer.gnome.org/integration-guide/stable/desktop-files.html.en.*

Pyroflea et al., How to type file names w/a space in it in terminal Aug. 20, 2011, Tom's Hardware, http://www.tomshardware.com/forum/237724-50-type-file-names-space-terminal.* frank.zappa et al., [ubuntu] How to access/modify files in terminal containg space in name Nov. 3, 2008, http://ubuntuforums.org/archive/index.php/t-968773.html.*

Hui-Ching Weng, "Does the Physician's Emotional Intelligence Matter?: Impacts of the physician's Emotional Intelligence on the trust, Patient-physician relationship, and satisfaction," Health Care Management Review: Oct./Dec. 2008, vol. 33, Issue 4, pp. 280-288.

Kin Fun Li, "Smart Home Technology for Telemedicine and Emergency Management," Original Research, J. Ambient Intell Human Comput., Springer, May 2012, pp. 1-12.

V.K. Murthy, et al., "Contextual Information Management Using Contract-Based Workflow," CF'05, May 2005, Italy, ACM, pp. 1-10.

Silvana Quaglini, et al., "Flexible Guideline-Based Patient Careflow Systems," Artifical Intelligence in Medicine Journal, vol. 22, Issue 1, Apr. 2001, pp. 65-80.

Yin-Pin Yang, et al., "Delivery of Services and Media: Using Keyword-Bubble Interaction in Personal Healthcare Management," IEEE International Conference on Consumer Electronics ICCE, 2012, pp. 337-338.

Campbell "CSS Trick: Turning a background image into a clickable link" Nov. 11, 2009, ra.ge., https://ran.ge/2009/11/11/css-trick-turning-a-background-image-into-a-clickable-link/; 5 PGS.

DELL LATITUDE D600 Specification 2003, Dell Inc., http://www.dell.com/downloads/global/products/latit/en/spec_latit_d600_en.pdf; 2 pgs.

Jackson et al., CSS Animations: W3C Working Draft, Apr. 3, 2012, 23C, https://www.w3.org/TR/2012/WD-css3-animations-20120403/; 17 pgs.

Lou Fullscreen Background Image Slideshow with CSS3, Jan. 2, 2012; tympanus.net, http://tympanus.net/codrops/2012/01/02/fullscreen-background-image-sfideshow-with-css3/; 12 pgs.

Lou et al., CSS3 Fullscreen Slideshow: A CSS-only slideshow for background images Jan. 2, 2012, tympanus.net, http://tympanus.net/Tutorials/CSS3FullscreenSlideshow/, "/index2.html, "findex3.html, "findex4.html; 4 pgs.

Dell Latitude "Dell Latitude C400", Dell; http://www.dell.com/downloads/us/products/latit/c400_spec.pdf; downloaded Jun. 17, 2016; 2 pgs.

Delonix, Windows History—from Windows 1 to Windows 10 date unknown [between Oct. 26, 2012 and "summer 2015"] quantumbooks, http://www.quantumbooks.com/technology/windows-history-from-windows-1-towindows-10/; 15 pgs.

Microsoft "How to Configure the Active Desktop; date unknown", microsoft.com, https://support.microsoft.com/en-us/kb/171437; 5 pgs.

* cited by examiner

KEYWORD-BASED USER INTERFACE IN ELECTRONIC DEVICE

PRIORITY

This application claims priority to Taiwan Patent Application No. 101137394, filed Oct. 9, 2012, and all the benefits accruing therefrom under 35 U.S.C. §119, the contents of which in its entirety are herein incorporated by reference.

BACKGROUND

The present invention relates to keyword-based user interfaces in an electronic device, and more particularly, to a method for producing a keyword-based user interface by automation.

In the information technology field, keywords are typically used to conduct a data search. The main advantage of keywords is that keywords carry semantic meanings comprehensible to a user. Hence, when used as search criteria, keywords yield a result which meets the user's expectations. Commercial search engines in wide use, such as Google, provide keyword search services, and thus they are not described in detail herein for the sake of brevity.

To enhance the precision of search results, the prior art, such as US Patent Application Publication 2008/0005107, discloses a way of conducting a search by a keyword tree.

SUMMARY

In one embodiment, a method for providing a user interface (UI) in an electronic device includes determining at least a starting keyword from a given target database, and associating each said starting keyword with a function of the electronic device; determining at least a linking keyword from a user profile database; creating a keyword tree from the at least a starting keyword and the at least a linking keyword, wherein the keyword tree has at least two layers, and the at least a linking keyword is placed in an upper layer relative to the at least a starting keyword; and providing the keyword tree on the electronic device for a user to browse and thereby select at least a said starting keyword by at least a said linking keyword on the keyword tree, thus starting the function.

In another embodiment, a method for providing a user interface (UI) of an electronic device includes providing a given keyword tree and presenting the keyword tree on the electronic device by visualization and layer by layer, wherein the keyword tree has at least two layers in a top-to-bottom direction to enable a user to use a keyword located at a layer of the keyword tree in selecting a first keyword of a next layer, thereby starting the electronic device to execute a first function.

In another embodiment, a method for providing a user interface (UI) of an electronic device includes presenting a first keyword on the electronic device by visualization, wherein the first keyword enables a user to start the electronic device for executing a first function; obtaining a first keyword-related first behavior pattern of the user during a given period of time; and adjusting how the first keyword is visually presented on the electronic device according to the first behavior pattern.

BRIEF DESCRIPTION OF THE SEVERAL VIEWS OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION

Embodiments of the present invention are characterized by a method for providing a keyword-based user interface in an electronic device. For example, the user interface of the present invention displays one or more layers of keyword menu for the user to choose from and thus guides the user to a function which the user wants to perform.

According to embodiments of the present invention, keywords are chosen from a text corpus artificially or by a machine, carry natural linguistic meanings or semantic meanings comprehensible to the user, and are for use in referring to extensive information embodied in the text corpus. Accordingly, in an embodiment of the present invention, daily meanings of keywords apply to the usage context of an electronic device so that the user can operate the electronic device with the user interface of the present invention according to the user's general understanding of the keywords.

Furthermore, embodiments of the present invention are further characterized in that keywords, which vary from user to user, serve as the user interface for operating the electronic device and even executing the same function.

Unlike the user interface (such as a "keyword menu") of the present invention, a conventional electronic device is equipped with a "function-based" user interface (such as a function menu or a tree directory), such that the user can browse the user interface only by means of a name or icon attributed to a function and configured by a program developer. However, the name or icon of the function is configured by the program developer from the perspective thereof and thus seldom bears any semantic meaning comprehensible to the user, thereby being susceptible to misinterpretation.

For example, users who seldom use Microsoft's Windows operating system are unlikely to get the meanings the program developer wants to instill into names or icons of "my computer" or "network neighborhood" displayed on the user interface and spotted by the users, nor can the users discern whether the names or icons are relevant to any function the users currently want to execute. In this regard, conventional user interfaces lack ease of use, because conventional user interface developers gave no consideration to the difference in the background or comprehension skills between the users. In view of this, an embodiment of the present invention is characterized in that the user interface dedicated to a user is produced in accordance with a keyword comprehensible to the user.

Furthermore, the advantage of a keyword-based user interface is that: the user understands the semantic meaning of each keyword or the information to be referred to by each keyword, and thus the user interface can be designed according to corresponding relationships of the semantic meanings of the keywords or the information to be referred to by the keywords in order for the user interface to have a tree structure or a hierarchical structure for assisting the user in browsing, such that the user can readily understand the context of the whole structure and browse it. For example, the user can understand readily that four keywords, namely "spring", "summer", "fall", "winter", belong to the same layer in the tree structure, and that "Christmas" belongs to the next layer and is linked to the keyword "winter".

Conceivably, with conventional user interfaces providing the name of a function only, it is difficult for the user to gain insight into the relation between the layers of a tree structure or hierarchical structure only by the name of a function in the absence of any other auxiliary tool.

In another aspect, comprehension of the same keyword varies from user to user, and thus an embodiment of the present invention is characterized in that the user interface dedicated to a user is produced in accordance with the user's understanding of a keyword. Referring to the example mentioned earlier, the keyword "Christmas" is linked to the keyword "winter" at the preceding layer as far as the user interface of a user located in the Northern Hemisphere is concerned, whereas the keyword "Christmas" is linked to the keyword "summer" at the preceding layer as far as the user interface of a user located in the Southern Hemisphere is concerned. Hence, when users are going to the keyword "Christmas", a selected path leading thereto on the tree structure of the user interface depends on user's understanding of the keyword and thus varies from user to user.

By contrast, the tree structure of the conventional user interface is designed in accordance with the name or icon of a function; as a result, not only are users forced to "learn" the meaning of every name on the function menu, but all the users are provided with the same path leading to a specific position of the tree structure of the user interface.

The present invention provides, in an embodiment thereof, a method for providing a user interface (UI) of an electronic device. The method includes determining at least a starting keyword from a given target database, and associating each said starting keyword with an function of the electronic device; determining at least a linking keyword from a user profile database; creating a keyword tree from the at least a starting keyword determined and the at least a linking keyword determined, wherein the keyword tree has at least two layers, and the at least a linking keyword determined is placed in an upper layer relative to the at least a starting keyword determined; and providing the keyword tree on the electronic device for a user to browse and thereby select at least a said starting keyword by at least a said linking keyword on the keyword tree, thus starting the function.

Embodiments of the present invention provide a method for providing a user interface (UI) of an electronic device. The method includes: determining at least one starting keyword from a plurality of given keywords and associating each said starting keyword with an function of the electronic device; determining at least one linking keyword from the plurality of given keywords; creating a keyword tree from the at least one starting keyword determined and the at least one linking keyword determined, wherein the keyword tree has at least two layers, and the at least one linking keyword determined is placed in an upper layer relative to the at least one starting keyword determined; and providing the keyword tree on the electronic device for a user to browse and thereby select at least one said starting keyword by at least one said linking keyword on the keyword tree, thus starting the function.

In yet another embodiment thereof, a method for providing a user interface of an electronic device includes: providing a given keyword tree and presenting the keyword tree on the electronic device by visualization and layer by layer, wherein the keyword tree has at least two layers in a top-to-bottom direction to enable a user to use a keyword located at a layer of the keyword tree in selecting a first keyword of a next layer, thereby starting the electronic device to execute a first function; obtaining a first keyword-related first behavior pattern of the user during a given period of time; and adjusting the keyword tree according to the first behavior pattern to move the first keyword up at least one layer.

In a further embodiment, a method for providing a user interface of an electronic device includes: presenting a first keyword on the electronic device by visualization, wherein the first keyword enables a user to start the electronic device for executing a first function; obtaining a first keyword-related first behavior pattern of the user during a given period of time; and adjusting how the first keyword is visually presented on the electronic device according to the first behavior pattern.

In a further embodiment, a method for providing a user interface of an electronic device having a background includes presenting a first keyword in the background by animation in response to an operation performed by a user on the electronic device, wherein the first keyword enables the user to start the electronic device for executing a first function.

In a further embodiment, a method for providing a user interface of an electronic device having a background includes presenting an icon in the background by animation in response to an operation performed by a user on the electronic device, wherein the icon enables the user to start the electronic device for executing a first function.

In a further embodiment, an electronic device includes a display unit, a memory, and a processor. The memory stores a computer-executable instruction. The processor accesses the memory to execute the computer-executable instruction, so as to present the user interface provided by the aforesaid method on the display unit.

Embodiments of the present invention disclose a computer program product stored on a computer-available medium. The computer program product comprises a computer-readable program for implementing the aforesaid methods when executed on a computer, so as to provide a user interface.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The following description, the appended claims, and the embodiments of the present invention further illustrate the features and advantages of the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a computer system, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 1 through FIG. 4, apparatus, methods, and computer program products are illustrated as structural or functional block diagrams or process flowcharts according to various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
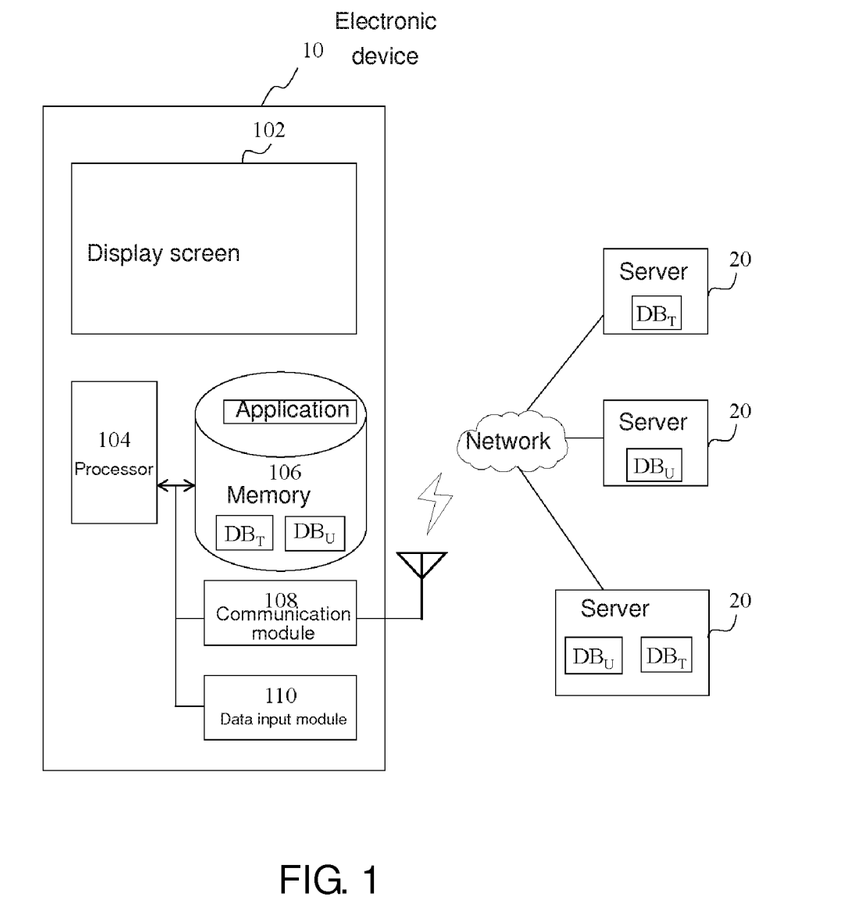
FIG. 1 is a block diagram of an electronic device according to an embodiment of the present invention.

FIG. 1 shows a block diagram of an electronic device 10 according to an embodiment of the present invention. The electronic device 10 comprises a display unit 102, a processor 104, a memory 106, a communication module 108, and a data input module 110.

The electronic device 10 comes in the form of a typical notebook computer or a portable information device similar thereto. Preferably, the electronic device 10 is a mobile phone. For details of the basic structure of the electronic device 10, make reference to products of Apple Inc., such as iPhone™.

For example, the processor 104 is a central processing unit (CPU) produced by ARM and adapted for use with a mobile device. The memory 106 is a flash memory which stores computer-executable instructions of an application AP and is accessible by the processor 104 to execute the computer-executable instructions.

The application AP comprises a keyword-based user interface illustrated with FIG. 2 through FIG. 4e and described below.

The communication module 108 effectuates networking by means of UMTS, GSM, or Wi-Fi and connects with one or more servers 20. The data input module 110 can be integrated with the display screen 102 to form a touch screen whereby a user creates data or enters instructions.

In this exemplary instance, the memory 106 is equipped with target database $DB_T$ and user profile database $DB_U$; however, it is also feasible for target database $DB_T$ and user profile database $DB_U$ to be disposed at the servers 20, such that the processor 104 of the electronic device 10 can access target database $DB_T$ and user profile database $DB_U$ at the servers 20 through the communication module 108.

In another exemplary instance not shown, the electronic device 10 comes in the form of a mainframe or a high-level workstation with robust processing capability and storing capability, such as IBM's System X, Blade Center or eServer, and provides a webpage interface whereby any user connected to the Internet can access the electronic device 10 by means of an electronic device or portable device in wide use.

The required network can also come in a connection of any type, including a wide area network (WAN) or a local area network (LAN) with static IP, or a temporary connection to the Internet through an Internet service provider (ISP), whether by cable connection or by wireless connection. Persons skilled in the art are able to understand that the network can also have other hardware and software elements (such as an additional computer system, a router, or a firewall) not shown in the accompanying drawings.

Figure 2:
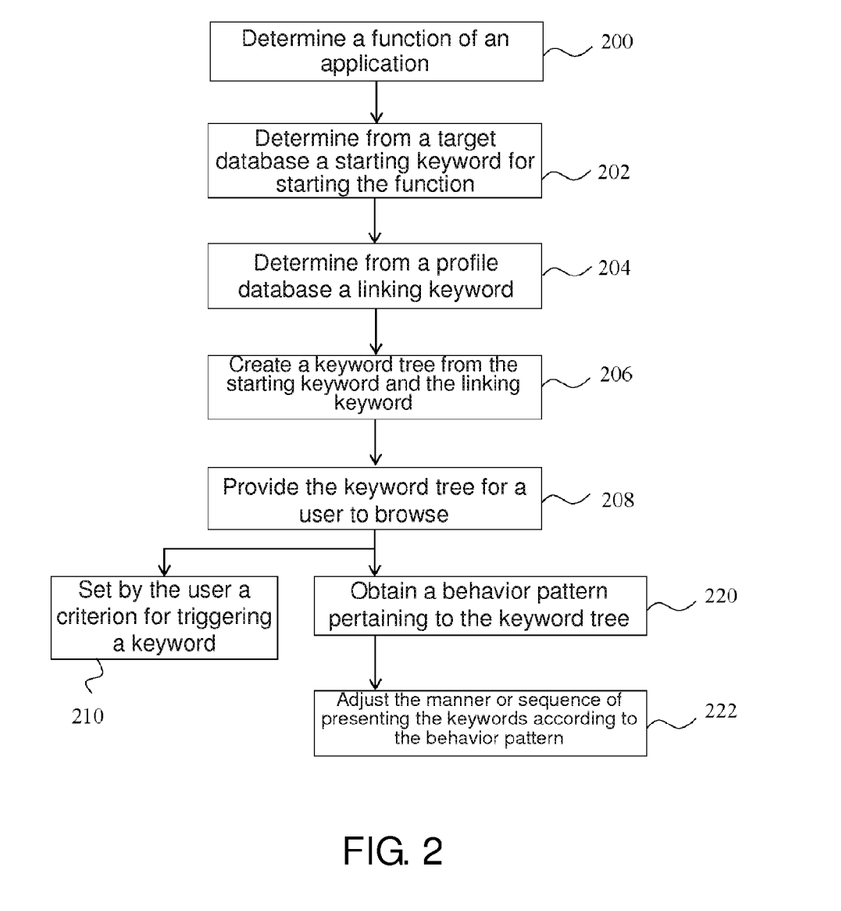
FIG. 2 is a flow chart of a method according to an embodiment of the present invention.

FIG. 2 is a flow chart of a method according to an embodiment of the present invention. Referring to the electronic device 10 shown in FIG. 1, the method for providing a keyword-based user interface for an application AP according to an embodiment of the present invention is described below.

Figure 3:
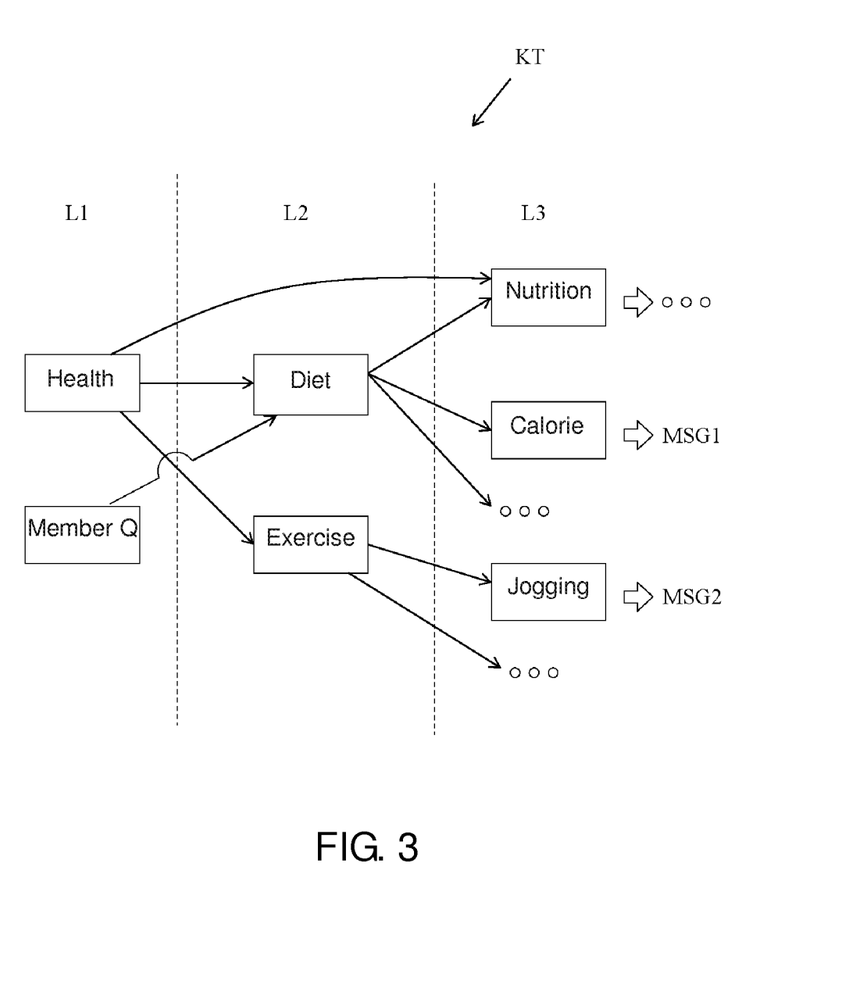
FIG. 3 shows a keyword tree according to an embodiment of the present invention.

Block 200: determining at least one function to be provided by an application AP. Block 200 is similar to its conventional counterpart regarding the existing way of developing applications. In this embodiment, the application AP is an application pertaining to personal health care guide, and its purpose is to provide users with daily health care information on an electronic device by means of text or multimedia, for example, displaying multimedia messages MSG1, MSG2 "recommended daily caloric intake for males aged 30 is X kcal" and "jogging is effective in alleviating disease Y" (as shown in FIG. 3).

The aforesaid application, whose nutrition tips or fitness tips can be illustrated with products available on Apple's App Store, does not have the user interface of the present invention. As a result, although the aforesaid application provides sufficient functionality (abundant health care information), the health care information is not readily accessible to users through an existing user interface.

Furthermore, in an embodiment of the present invention, the functionality of the application AP is not restricted to displaying multimedia messages but includes controlling components (such as a camera unit) mounted on the electronic device or controlling the other applications (for example, controlling a voice communication program to dial the phone number of a specific subject).

Block 202: in an aspect of the present invention, a keyword-based user interface is provided; hence, this block entails determining starting keywords for use in starting each function of the application AP.

The starting keywords are either set by a program developer, or are chosen or created from a target database $DB_T$. After the starting keywords have been determined, the starting keywords are associated with the function. The target database $DB_T$ is either created by the program developer, or is created by following any advice provided by a domain expert. In a preferred embodiment, target database $DB_T$ comprises specific contents and information pertaining to a function (such as multimedia messages) provided by the application AP, wherein target database $DB_T$ automatically parses the contents and information of the function beforehand to thereby create multiple keywords for functioning directly as the starting keywords or a candidate list thereof to be screened by a developer, thereby allowing the starting keywords to be automatically associated with the function.

For example, after the multimedia message MSG1 "recommended daily caloric intake for males aged 30 is X kcal" has been parsed, its elements, namely "aged 30", "males", and "calorie", are automatically treated as the keywords for starting the display of the multimedia message MSG1. After the multimedia message MSG2 "jogging is effective in alleviating disease Y" has been parsed, its elements, namely "disease Y" and "jogging", are automatically treated as the keywords for starting the display of the multimedia message MSG2.

In an exemplary instance not shown, if a function provided by the application AP is "dialing 24-hour enquiry hotline automatically for hospital's advice on disease Z", the function will be parsed in a manner to treat "disease Z" or "enquiry hotline" automatically as the keyword for starting the dialing function.

Block 204: the starting keywords in block 202 are directly associated with the function of the application AP, and thus their semantic meanings are not only specific or narrow but are also unlikely to be used in the user's daily vocabulary. To enable the user to browse the user interface easily, it is preferable to introduce some linking keywords for providing background-specific or guide-like keywords which carry extensive semantic meanings or are in wide use in the user's daily life to thereby assist the user in associating the introduced linking keywords with the starting keywords in block 202.

In an embodiment, the linking keywords are selected or created from target database $DB_T$, for example, in block 202, unselected starting keywords serve as the linking keywords.

Alternatively, the linking keywords can be set by the user. However, in a preferred embodiment, the linking keywords are selected or created from profile database $DB_U$, wherein profile database $DB_U$ stores the user's personal data related to age, gender, nationality, educational background, medical record, and web browsing history or stores personal profiles available on social networking services (such as Facebook or Twitter).

Understandably, linking keywords created from profile database $DB_U$ must have the same context as the user's daily life does, and thus their semantic meanings are understood by the user quickly and correctly. Furthermore, profile database $DB_U$ parses personal data automatically to thereby create multiple keywords which serve directly as the linking keyword or a candidate list thereof. For example, "health", "exercise", and "diet" serve as the linking keywords, as soon as the user's web browsing history indicates that a health information-related Website has a high click through rate (CTR).

If the user wants to include the other users' personal data in profile database $DB_U$ for reference, it is preferable to screen the other users' personal data by a similarity algorithm beforehand to ensure that the other users will be peers to the user, that is, the other users manifest considerable similarity with the user in a given dimension, and thus the linking keywords created from profile database $DB_U$ by means of the peers' personal data can be provided to the user for meaningful reference.

Techniques of calculating the similarity of multiple users by a similarity algorithm to determine peers are not only well known to persons skilled in the art but are also disclosed in Taiwan Patent Application No. 101127574 filed by the applicant of this patent application, and thus the techniques are not described in detail herein for the sake of brevity.

In another embodiment, if the user's personal profile available on a social networking service indicates that the user has intimate interaction or close linking relationship with a member Q on another social networking service, it will also be feasible to treat "member Q" as a linking keyword. Hence, it is further determined, according to the record of interaction between the user and member Q on the social networking service, that both the user and member Q are highly interested in diet-related topics, and thus "diet" can also be treated as a linking keyword.

In another aspect, if member Q agrees to share his or her web browsing history or personal data with the user, member Q will be deemed the aforesaid peer to thereby create a linking keyword for use by the user on the electronic device 10, or it will even be feasible to directly treat any keyword predetermined by member Q (or another peer) as the user's own linking keyword.

In the aforesaid embodiment, target database $DB_T$ in block 202 and profile database $DB_U$ in block 204 are two separate databases. However, in another embodiment, target database $DB_T$ and profile database $DB_U$ are integrated to become a single database. Methods of generating keywords automatically from a given database (target database $DB_T$ or profile database $DB_U$) are not only well known to persons skilled in the art but are also disclosed in U.S. Patent Application Publication 2005/0086219 and U.S. Pat. No. 7,546,280, and thus the methods are not described in detail herein for the sake of brevity.

This embodiment of the present invention does not require that blocks 200-204 have a specific execution sequence, and more particularly, does not specify the sequence of determination of functions, starting keywords, and linking keywords, and thus the determination of functions, starting keywords, and linking keywords can take place separately, and it is even feasible to determine starting keywords and linking keywords first and then determine functions.

Block 206: creating by the program developer a keyword tree KT with a hierarchical structure from starting keywords determined in block 202 and linking keywords determined in block 204 according to their semantic meanings, as shown in FIG. 3. Given adequate text corpus samples (such as the archives of a news Website), a computer program can analyze and identify the general semantic meaning of each keyword and thereby automatically create the keyword tree KT.

In this embodiment, the keyword tree KT has layers L1, L2, L3 in a top-to-bottom direction. The linking keywords "health" and "member Q" are placed in the top layer L1. The linking keywords "exercise" and "diet" are placed in the intermediate layer L2. The starting keywords "nutrition", "calorie" and "jogging" are placed in the bottom layer L3.

The keyword tree KT shown in FIG. 3 is illustrative of the present invention and thus can represent a portion of the keyword tree of the present invention, because the embodiments of the present invention are not restrictive of the size of the keyword tree.

Furthermore, whether a keyword is a "linking keywords" or a "starting keywords" may depend on specific functions of the application AP; hence, referring to FIG. 3, the "linking keywords" located at layers L1, L2 can serve as the "starting keywords" of the other functions. Similarly, the "starting keywords" located at layer L3 in FIG. 3 can serve as the "linking keywords" of the other functions.

In another aspect, there is at least one path between any two keywords on the keyword tree in an embodiment of the present invention. Referring to FIG. 3, keywords "health" and "nutrition" are either directly linked up, or linked via keyword "diet" or another keyword (not shown). Hence, when compared with conventional user interfaces characterized by a "functionality-based" hierarchical menu or tree directory, the present invention provides a keyword tree which features high flexibility and high popularity among users.

Block 208: providing the keyword tree KT on the electronic device 10 for the user to browse. For example, the keyword tree KT comes in the form of a hierarchical menu or tree directory (but the present invention is not limited thereto, for more examples, see FIG. 4a through FIG. 4e), such that the user can select the "linking keywords" at layers L1, L2 by means of the hierarchical menu and then select the "starting keywords" at layer L3 to thereby start a function associated with the starting keywords (see block 200).

Block 210: as mentioned earlier, the keyword tree KT comes in the form of a hierarchical menu or tree directory. For related details of a hierarchical menu or tree directory, make reference to function-based hierarchical menus and tree directories of the user interface of Microsoft's Windows operating system. Take a hierarchical menu as an example, it enables the user to select and trigger any item on the menu and thereby display a next-layer menu or start a specific function.

The hierarchical menu in an embodiment of the present invention is keyword-based (rather than "function-based" according to the prior art) and thus keywords can serve as items on the menu; hence, in block 210, optionally, the user is allowed to set a criterion for selecting and triggering a specific keyword automatically.

Unlike the prior art which discloses function-based menus, the present invention, in an embodiment thereof, adopts a keyword-based menu in which keywords serving as items on the menu, and thus the user is allowed to set keywords of any hierarchical structure (rather than set the "starting keywords" of the next layer only). Furthermore, in an embodiment of the present invention, the configuration of keywords is based on semantic meanings thereof and thus is so simple that the user does not even need to know the positions of the keywords on the keyword tree, nor does the user need to understand the framework of the keyword tree.

Referring to FIG. 3, the user may configure that keyword "health" of layer L1 is automatically selected and triggered and keyword menu (which has thereon items presented in the form of keywords "diet" and keyword "exercise") of layer L2 is automatically unfolded as soon as the electronic device 10 determines that the current time or place matches a default value or the electronic device 10 receives a specific signal (such as a specific phone number of an incoming call or a RF signal carrying a specific message). Likewise, the user may further set another criterion for automatically selecting and triggering keyword "exercise" or "diet" of layer L2 to thereby unfold the keyword menu of layer L3. In another embodiment, if the electronic device 10 has a sound input function (carried out by a microphone, for example), the user can set the criterion for automatically selecting and triggering keyword "health" of layer L1 to a received sound, say, the sound produced by the user's pronunciation of the word "health" or the sound produced by the user's exhalation toward a microphone.

In another embodiment, if the electronic device 10 is capable of sensing light (by means of a light sensor, for example), the user can set the criterion for automatically selecting and triggering keyword "health" of layer L1 to a light ray perceived. For example, the user may set the criterion to the detection that the light intensity of a light ray sensed by a light sensor is lower than a default value (for example, as a result of the user's hiding the light sensor by hand, or when the light sensor-equipped side of the electronic device 10 is turned away from a light source). However, the aforesaid technical feature is not essential for the present invention.

Block 220: after providing the keyword tree KT for serving as the user interface, the application AP can be configured with a given period of time (such as a day, a week, or a month), so as to obtain the user's behavior pattern toward the keyword tree KT during the given period of time, for example, the frequency of selecting a specific keyword or specific path on the keyword tree KT, the most common time and place of a specific keyword or specific path, or a remark entered by the user (with a button "like" or "dislike") and directed to a specific keyword.

By a value-assigning data processing process, each keyword or path on the keyword tree KT is assigned a value indicative of the user's behavior pattern to thereby allow comparison, statistical analysis, or evaluation to be performed. The present invention is not restrictive to the aforesaid way of data processing whereby a value is assigned to indicate a behavior pattern.

Block 222: after a value has been assigned to each keyword or path on the keyword tree KT to indicate the user's behavior pattern, if the keyword tree KT is presented on the electronic device 10 by visualization and layer by layer, it will be feasible to adjust how a keyword is presented according to the behavior pattern value of the keyword or adjust how each keyword on a path is presented on the user interface according to the behavior pattern value of the path.

By this operation, it is feasible to predict keywords which are likely to appeal to a user and highlight the displayed keywords according to the user's past behavior pattern.

The aforesaid adjustment is carried out, for example, by changing the font size, font, position, and color of a keyword presented on the user interface as well as the sequence in which the keyword and the other keywords are presented in the same layer. The extent of the aforesaid adjustment depends on either the difference between the behavior pattern value of the keyword (or path) and a preset reference value, or the difference between the behavior pattern value of the keyword (or path) and the behavior pattern value of another equivalent keyword (or path).

Referring to FIG. 3, for example, if the behavior pattern value (determined in block 220) of keyword "health" of layer L1 is higher than that (determined in block 220) of keyword "member Q" in the same layer, block 222 can entail presenting keyword "health" in a font larger than keyword "member Q".

For example, if the behavior pattern value (determined in block 220) of path 1 (from keyword "health" of layer L1 to keyword "diet" of layer L2) is higher than that (determined in block 220) of path 2 (from keyword "health" of layer L1 to keyword "exercise" of layer L2), block 222 can entail presenting keyword "diet" of layer L2 on path 1 with a higher priority or in a more conspicuous manner than keyword "exercise" of layer L2 on path 2. The main difference between the two aforesaid exemplary instances is described below. The latter exemplary instance gives considerations to a path, that is, keywords in the upper layer, wherein the result of the calculation of a behavior pattern value varies from path to path (for example, switching to keyword "member Q" of layer L1 but keeping the same keywords in layer L2 (i.e., using keyword "diet" and keyword "exercise"), whereas visual presentation of the keywords is likely to vary accordingly. By contrast, the former exemplary instance gives no considerations to keywords in the upper layer.

Moreover, in addition to adjusting how a keyword is visually presented according to a behavior pattern value, the behavior pattern value is further for use in adjusting the position of a keyword on the keyword tree KT. For example, if the behavior pattern value (determined in block 220) of keyword "nutrition" of layer L3 is higher than that (determined in block 220) of keyword "calorie" of layer L3 and the difference therebetween is larger than a predetermined value, block 222 can entail upgrading keyword "nutrition" from layer L3 to layer L2 and omitting linking keyword (i.e., keyword "diet") of layer L2 from its upward path such that keyword "nutrition" is linked directly to linking keyword (i.e., keyword "health") of layer L1, thereby allowing the user to browse much more easily.

In addition to a conventional hierarchical menu or tree directory, FIGS. 4a-4e illustrate another way of providing the keyword tree KT (as shown in FIG. 3) for the user to browse.

Figure 4A:
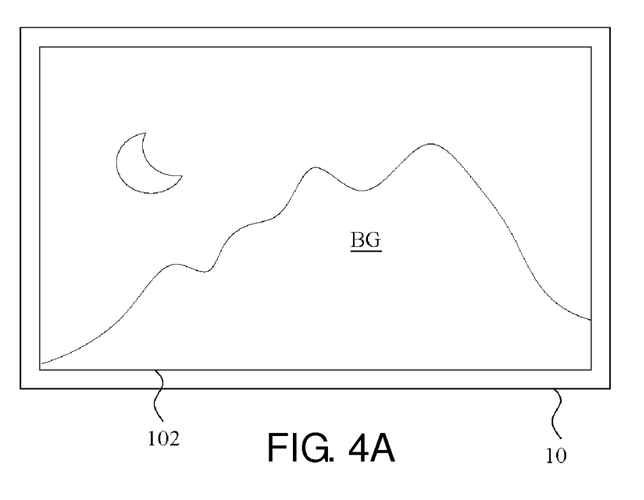
FIGS. 4A, 4B, 4C, 4D and 4E are schematic views of a user interface according to an embodiment of the present invention.

FIG. 4a shows that the keyword tree KT has not yet been presented or is hidden, thereby showing that the electronic device 10 has a background BG (such as wallpaper). Keywords at a specific layer on the keyword tree KT are displayed, in response to an operation performed by the user on the electronic device 10, for example, the user's pressing a specific physical button (not shown), or the detection by the electronic device 10 of an event (say, the detection that the electronic device 10 is being shaken in a specific manner by the user or has been overturned by the user, the detection of sound input, or the detection of a specific signal by the electronic device 10) configured by the user.

Figure 4B:
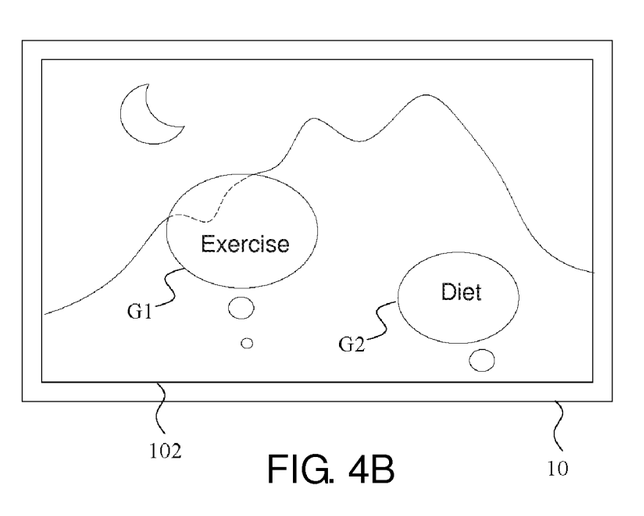

Referring to FIG. 4b, which shows keywords "exercise" and "diet" of layer L2, wherein keywords "exercise" and "diet" are presented in the form of icons G1, G2, respectively, and presented in the background BG by animation.

In an embodiment, the user watches icons G1, G2 moving in the background BG. Furthermore, icons G1, G2 for keywords "exercise" and "diet" have their respective unique visually perceivable features in terms of size, shape, color, and transparency. In the embodiment illustrated with FIG. 4b, icons G1, G2 for keywords "exercise" and "diet" have different bubbly peripheries, wherein bubbly icons G1, G2 rise slowly from the bottom border of the background BG like real bubbles do in response to an operation (such as shaking, overturning, and sound input) performed by the user on the electronic device 10. For example, the user selects and triggers keyword "diet" by pressing bubbly icon G2, and then keywords (not shown) of the bottom layer L3 are displayed in a way similar to that of icons G1, G2.

In an exemplary instance not shown, bubbly icons G2, G2 rise, and they begin to move horizontally or downward as soon as their periphery comes into contact with the bottom border of the background BG. Bubbly icons G1, G2 are not only adjustable in shape and size but also capable of simulating real bubbles.

As with real bubbles, icons G1, G2 each preferably have a transparency (whether equal or unequal) whereby the background BG is partially exposed.

Optionally, in response to an operation (such as a click) performed by the user, bubbly icons G1, G2 either stop moving to be quiescently presented in the background BG or disappear from the background BG. Alternatively, the user may configure that, when a predetermined period of time has lapsed, bubbly icons G1, G2 either stop moving to be quiescently presented in the background BG or disappear from the background BG automatically. In another aspect, in response to an operation (such as a drag) performed by the user, the user either moves bubbly icons G1, G2 to an intended position in the background BG and presents bubbly icons G1, G2 quiescently, or throws bubbly icons G1, G2 out of the background BG to make bubbly icons G1, G2 disappear from the background BG and makes a "dislike" remark by means of the aforesaid throw-out (see block 220 of FIG. 2), for example.

Figure 4C:
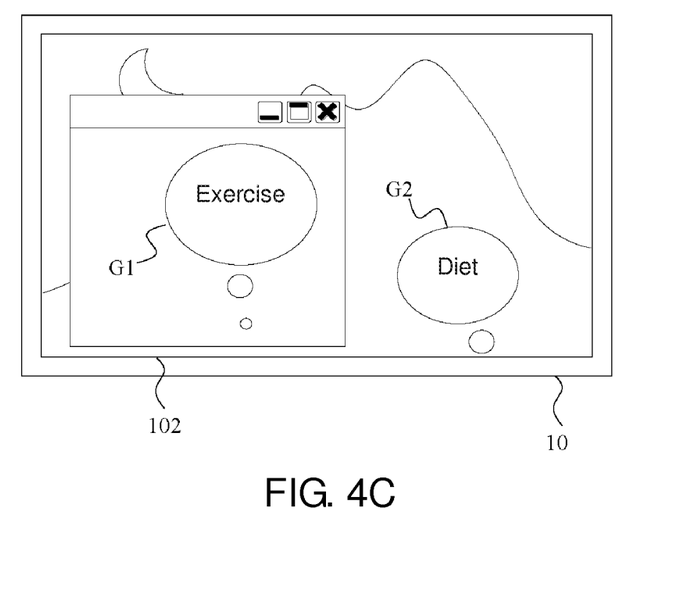

In another aspect, in an embodiment illustrated with FIG. 4c, in response to an operation (such as a drag) performed by the user, the user moves bubbly icons G1, G2 to an interface of an operating system or another application of the electronic device 10, such that functions or information directly or indirectly associated with bubbly icons G1, G2 (for example, through their downward hierarchical structure) are accessible by the operating system or the other application. For example, the user drags bubbly icons G1, G2 to an attachment selection interface (shown in FIG. 4c) of an email program to thereby treat any information or file associated with bubbly icons G1, G2 as an attachment to an email.

Figure 4D:
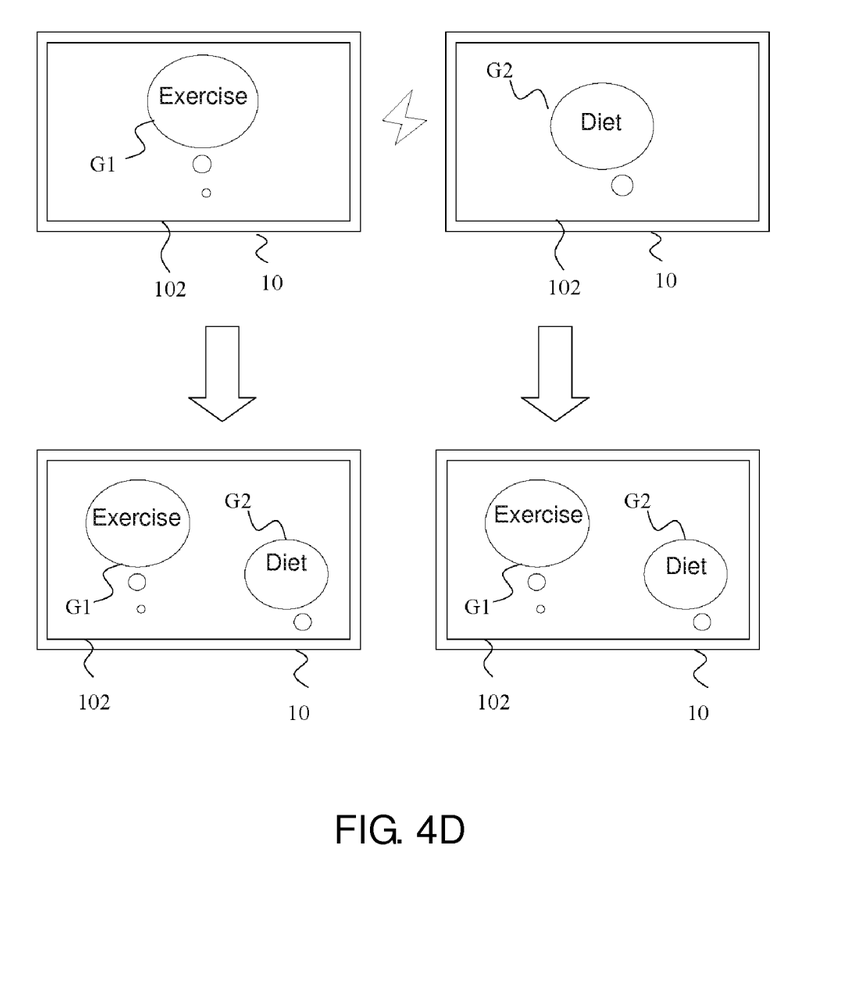

Referring to FIG. 4d, two electronic devices 10 operate synchronously as configured by the user, and thus the two electronic devices 10 either display at least one keyword (i.e., bubbly icons G1, G2) of a specific layer in the keyword tree KT simultaneously according to a synchronization signal between the two electronic devices 10 (for example, by Wi-Fi or Bluetooth), or create their respective keyword trees KT anew according to information carried by the synchronization signal to thereby achieve the effect of sharing or exchanging keywords.

Figure 4E:
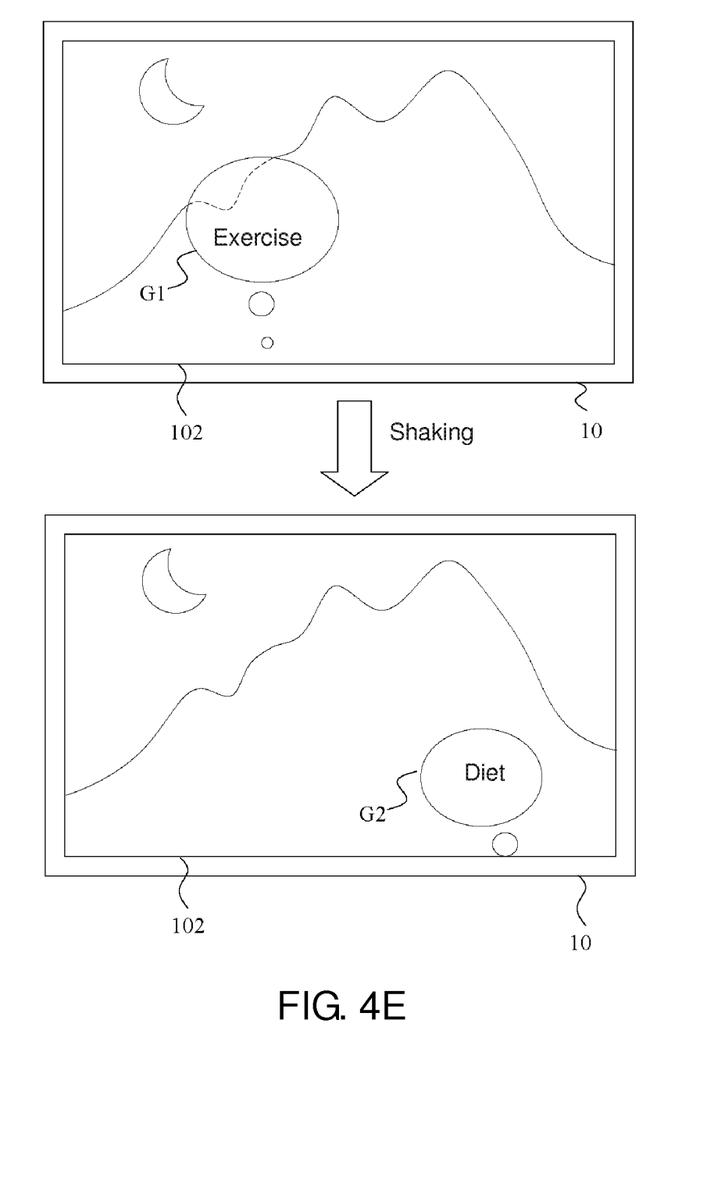

In an embodiment illustrated with FIG. 4e, which is similar to an embodiment illustrated with FIG. 4b, in response to an operation performed by the user on the electronic device 10, keywords of a specific layer on the keyword tree KT are displayed. However, the embodiment of FIG. 4e is different from the embodiment of FIG. 4b in that, in the embodiment of FIG. 4e, only one keyword (such as keyword "exercise" G1 of layer L2) is displayed in each instance, and then another keyword (such as keyword "diet" G2 of layer L2) in the same layer is displayed in response to another operation (for example, shaking the electronic device 10) performed by the user on the electronic device 10, with the original keyword (i.e., keyword "exercise" G1) being displayed or hidden no more, wherein keyword icons G1, G2 are displayed in a preset sequence or in a sequence determined in accordance with the keyword behavior pattern mentioned in blocks 220, 222 illustrated with FIG. 2.

In this embodiment, keywords are not necessarily displayed in the form of icons. For example, it is also feasible for the keywords to be presented dynamically by means of a marquee at the bottom of the background BG without involving use of icons. Conversely, if the icons depicted in FIGS. 4b-4e are also employed to start a specific function, the icons will not necessarily be implemented in conjunction with the method depicted in FIG. 2 or FIG. 3.

The foregoing embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

The invention claimed is:

1. A method for providing a user interface (UI) in an electronic device, the method comprising:
   determining a plurality of candidate starting animated keywords from a given target database, and associating each of the plurality of candidate starting animated keywords with a function of an application installed on the electronic device having a background, wherein the function is associated with at least two of the plurality of candidate starting animated keywords and wherein the plurality of candidate starting animated keywords are chosen by a processor and have a semantic meaning that is directly associated with the function;
   determining a linking keyword from a user profile database;
   creating a keyword tree from the plurality of candidate starting animated keywords and the linking keyword, wherein the keyword tree has at least two layers, and the linking keyword is placed in an upper layer relative to the candidate starting animated keywords;
   providing the keyword tree in the background of the electronic device for a user to browse and thereby select a desired starting keyword from the plurality of candidate starting keywords by the linking keyword on the keyword tree, thus starting the function, wherein more than one of the plurality of candidate starting animated keywords are associated with the function such that a user selection of any of the more than one of the plurality of candidate starting animated keywords causes the function to be executed; and receiving, a selection of one of the plurality of candidate starting animated keywords from the user, wherein the selection is based on the semantic meaning of the keyword.

2. The method of claim 1, wherein the user profile database comprises personal data of a plurality of users.

3. The method of claim 2, wherein personal data of said plurality of users manifests a given degree of similarity by a similarity algorithm.

4. The method of claim 1, wherein the function entails displaying a specific data in the given target database.

\* \* \* \* \*